US012212907B2

(12) United States Patent
Liu

(10) Patent No.: US 12,212,907 B2
(45) Date of Patent: Jan. 28, 2025

(54) SPEAKER APPLICABLE TO BE FIXED ON ARCHED SURFACE

(71) Applicant: HUIZHOU VOLANT ROC ELECTRONICS TECH CO., LTD., Guangdong (CN)

(72) Inventor: Jianbo Liu, Guangdong (CN)

(73) Assignee: HUIZHOU VOLANT ROC ELECTRONICS TECH CO., LTD., Huizhou (CN)

( * ) Notice: Subject to any disclaimer, the term of this patent is extended or adjusted under 35 U.S.C. 154(b) by 215 days.

(21) Appl. No.: 18/015,080

(22) PCT Filed: Dec. 28, 2020

(86) PCT No.: PCT/CN2020/139806
§ 371 (c)(1),
(2) Date: Jan. 9, 2023

(87) PCT Pub. No.: WO2022/036976
PCT Pub. Date: Feb. 24, 2022

(65) Prior Publication Data

US 2023/0254614 A1 Aug. 10, 2023

(30) Foreign Application Priority Data

Aug. 20, 2020 (CN) ........................ 202021749916.4

(51) Int. Cl.
*H04R 9/02* (2006.01)
*H04R 1/02* (2006.01)
*H04R 1/28* (2006.01)
*H04R 9/06* (2006.01)

(52) U.S. Cl.
CPC ............ *H04R 1/025* (2013.01); *H04R 1/288* (2013.01); *H04R 9/025* (2013.01); *H04R 9/06* (2013.01); *H04R 2400/11* (2013.01)

(58) Field of Classification Search
CPC ........ H04R 1/025; H04R 1/288; H04R 9/025; H04R 9/06; H04R 2400/11
See application file for complete search history.

(56) References Cited

U.S. PATENT DOCUMENTS 8,023,684 B2 * 9/2011 Wathen ................. H04R 1/025
381/387

* cited by examiner

*Primary Examiner* — Brian Ensey

(57) ABSTRACT

The disclosure provides a speaker applicable to be fixed on an arched surface. It comprises a sound making member and a fixing frame connected therewith. The sound making member comprises a connecting frame, a magnetic element arranged at the front portion of the connecting frame, and a damper arranged at the rear portion of the connecting frame. The fixing frame is arched-shaped and fixedly connected with the back side of the connecting frame. It is arranged with a plurality of mounting holes, through each of which a fastening component can pass. It is designed to achieve an optimized box volume of the speaker box, and effectively simplifies the development of the moulds for the main body of the speaker box. It has merits such as reliable and convenient fixation, stable structure, convenient attachment and detachment, improved sound quality and sound effect.

14 Claims, 3 Drawing Sheets

SPEAKER APPLICABLE TO BE FIXED ON ARCHED SURFACE

TECHNICAL FIELD

The disclosure relates to the technical field of speakers, and more particularly, to a speaker applicable to be fixed on an arched surface.

BACKGROUND

A speaker, also known as a loudspeaker, is a piece of equipment that changes electrical signals into sound. When electrical energy is transferred to the coil, the coil presents a magnetic field interaction of the energy and the magnet, and the interaction causes the cone to vibrate. As the electrical energy changes all the time, the coil of the speaker moves back and forth, and the cone of the speaker moves as well. Such motions result in a change of the density of air, whereby a sound is produced.

Existing speakers usually can only be fixed on a plane surface of a structure. If a speaker needs to be mounted on an arched surface at the installation site, a mounting platform having a plane surface has to be manually constructed on the arched surface, to allow the speaker to be fixedly fastened thereon. It is inconvenient to fix the device on the arched surfaces, such as a cylindrical surface, or the special-shaped surfaces. Such mounting process brings difficulties to the development of the moulds for the device, requires high stability of the device, and leads to high cost. Further, as the speaker box which can only be secured on the plane surface has a body structure which is confined by the plane surface, its development and design are restricted too. Especially, with the diversified development of Bluetooth® speakers, many speaker boxes with various shapes, such as those having an arched surface, are available on the market. Thus, how to achieve its fixed installation is a realistic problem that needs to be solved.

SUMMARY

An object of the disclosure is to provide a speaker applicable to be fixed on an arched surface, to solve the above problems mentioned in the background.

To achieve the goal, the disclosure provides a technical solution as follow.

A speaker applicable to be fixed on an arched surface comprises a sound making member and a fixing frame connected with the sound making member. The sound making member comprises a connecting frame, a magnetic element arranged at the front portion of the connecting frame, and a damper arranged at the rear portion of the connecting frame. The fixing frame is arched-shaped and is fixedly connected with the back side of the connecting frame. The fixing frame is arranged with a plurality of mounting holes, through each of which a fastening component can pass.

Preferably, the fixing frame may be cylindrically shaped, to facilitate processing and fixation. Preferably, the arched surface of the fixing frame may form an inner arc facing forward, to achieve improved acoustics effect and mounting effect. Preferably, the mounting holes may include middle holes provided on the fixing frame, formed in a middle position, and are arranged in a longitudinal direction of the fixing frame, and may include side mounting holes symmetrically provided on the left portion and the right portion of the fixing frame.

Preferably, the fastening components may be expansion bolts. The expansion bolts may be fixed on the mounting surface such as an arched surface of a wall, and then the bolts may pass through the mounting holes, respectively. After that, nuts may be screwed into bolts, respectively. In this manner, the speaker can be fixed on an arched surface. In such a case, in order to fixedly mount the speaker on the mounting surface by nuts, it merely needs to provide holes on the mounting surface at positions which correspond to the positions of the mounting holes of the fixing frame, and fixedly mount expansion bolts.

The box volume can directly affect the sound quality. To achieve an optimized box volume of the speaker box with a minimized size to improve efficiency, the connecting frame may preferably have a stepped cylindrical structure with a diameter increasing from the front to the back. The connecting frame may comprise a magnet step portion and a springing step portion. The magnetic element may be mounted inside the magnet step portion which is provided on the front end and has a relatively small diameter. The damper may be arranged on the inner side of the springing step portion which is provided on the rear end and has a relatively big diameter. Preferably, the springing step portion may include a plurality of steps which have diameters increasing from the front to the back. Each step may be provided with a plurality of through holes, respectively, and the damper may be circumferentially fixedly arranged on the inner side of the through holes. Preferably, the through holes of different steps may be evenly distributed and are staggered, to achieve improved acoustics effect. Herein, the damper may be made of materials such as cloth, silk, anti stretch fabric, and blends.

Preferably, the connecting frame and the fixing frame may have one-piece structure. More preferably, the connecting frame and the fixing frame may be one-piece injection molded.

Compared with the prior art, the disclosure has advantages as follows. The speaker applicable to be fixed on an arched surface according to the disclosure is designed to achieve an optimized box volume of the speaker box. It effectively simplifies the development of the moulds for the main body of the speaker box. It has merits such as reliable and convenient fixation, stable structure, convenient attachment and detachment, improved sound quality and sound effect.

Herein: 1. fixing frame; 2. springing step portion; 3. magnetic element; 4. damper; 5. middle holes; 6. side mounting holes; 7. magnet step portion.

DETAILED DESCRIPTION OF ILLUSTRATED EMBODIMENTS

The embodiments of the disclosure will be clearly described below in detail with reference to the drawings. The described embodiments are merely some embodiments of the disclosure, but are not to limit the disclosure in any form. Those skilled in the art may obtain equivalent embodiments without departing from the scope of the disclosure.

The disclosure is intended to cover all modifications and equivalents included within the scope of the disclosure.

Figure 1:
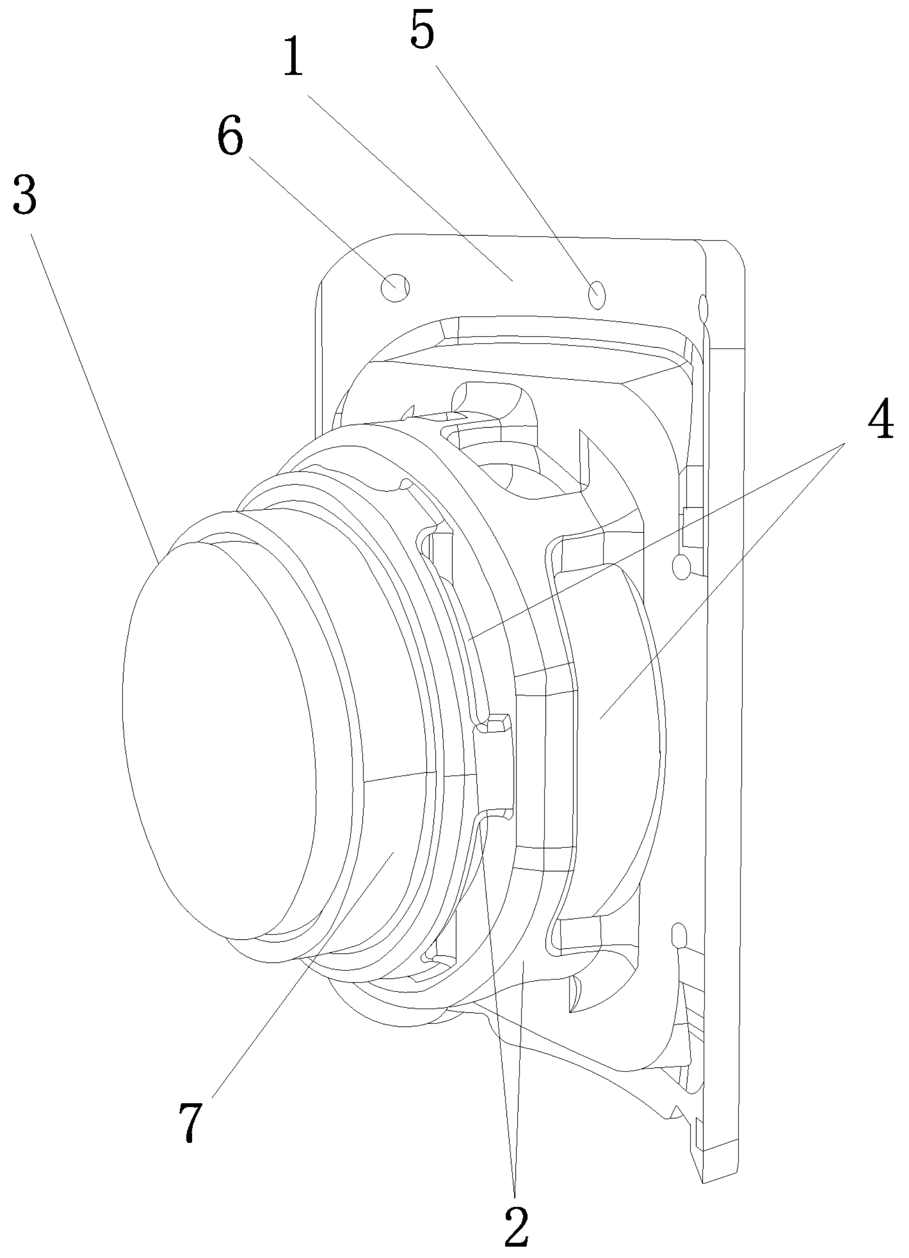
FIG. 1 is a structural schematic view illustrating a front side of a speaker according to the disclosure.
Figure 2:
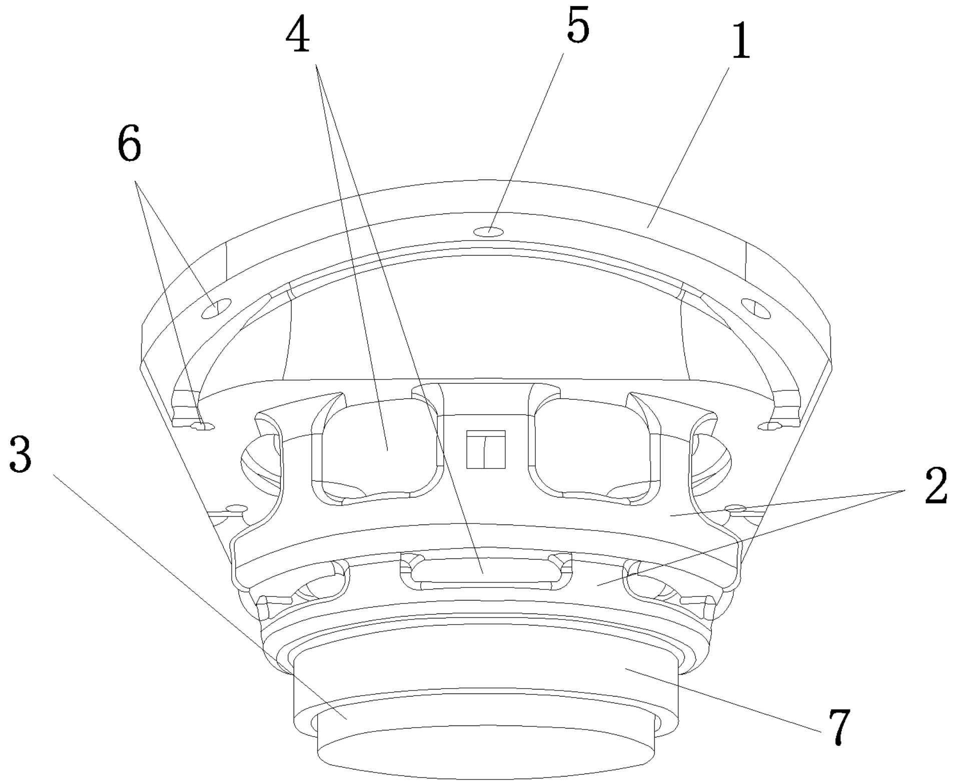
FIG. 2 is a structural schematic view illustrating a top side of a speaker according to the disclosure.
Figure 3:
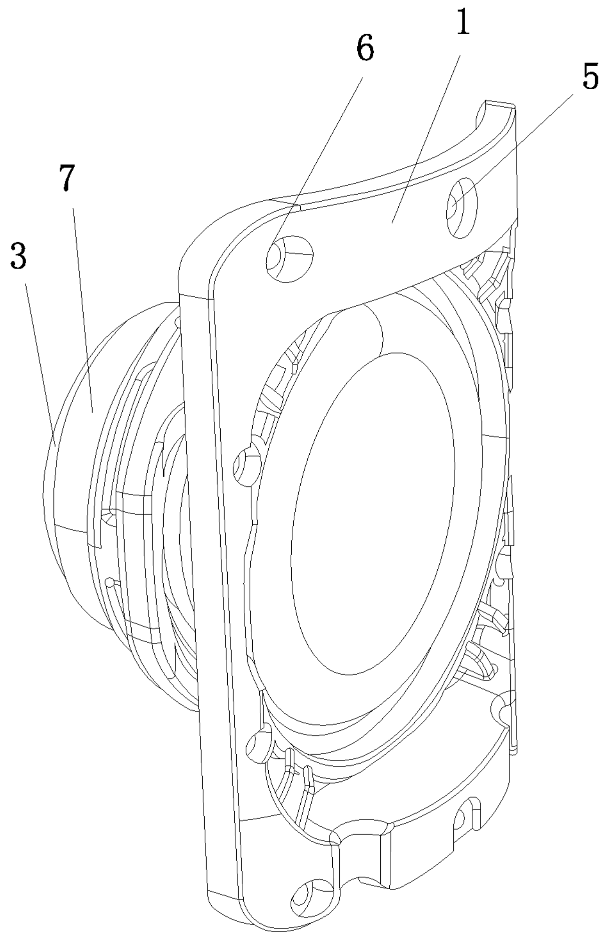
FIG. 3 is a structural schematic view illustrating a back side of a speaker according to the disclosure.

Referring to FIGS. 1-3, a speaker applicable to be fixed on an arched surface comprises a sound making member and a fixing frame 1 connected with the sound making member. The sound making member comprises a connecting frame, a magnetic element 3 arranged at the front portion of the connecting frame, and a damper 4 arranged at the rear portion of the connecting frame. The fixing frame 1 is arched-shaped and is fixedly connected with the back side of the connecting frame. The fixing frame 1 is arranged with a plurality of mounting holes, through each of which a fastening component can pass. The fixing frame 1 is cylindrically shaped, and the arched surface of the fixing frame 1 forms an inner arc facing forward or an outer arc to fit various arched structures. The mounting holes include middle holes 5 and side mounting holes 6. The middle holes 5 are provided on the fixing frame 1. The middle holes 5 are formed in a middle position and are arranged in a longitudinal direction of the fixing frame 1. The side mounting holes 6 are symmetrically provided on the left portion and the right portion of the fixing frame 1. The fastening components may be expansion bolts. The expansion bolts may be fixed on the mounting surface such as an arched surface of a wall, and then the bolts may pass through the mounting holes, respectively. After that, nuts may be screwed into bolts, respectively. In this manner, the speaker can be fixed on an arched surface.

The connecting frame has a stepped cylindrical structure with a diameter increasing from the front to the back. The connecting frame comprises a magnet step portion 7 and a springing step portion 2. The magnetic element 3 is mounted inside the magnet step portion 7 which is provided on the front end of the connecting frame and has a relatively small diameter. The damper 4 is arranged on the inner side of the springing step portion 2 which is provided on the rear end of the connecting frame and has a relatively big diameter. The springing step portion 2 includes a plurality of steps which have diameters increasing from the front to the back. Each step is provided with a plurality of through holes, respectively, and the damper 4 is circumferentially fixedly arranged on the inner side of the through holes. To achieve improved acoustics effect, the through holes of different steps are evenly distributed and are staggered. In such a case, the damper 4 may be made of materials such as cloth, silk, anti stretch fabric, and blends.

Herein, the connecting frame and the fixing frame 1 are one-piece injection molded.

Some embodiments of the disclosure are illustrated and described. Based on the embodiments, those skilled in the art may obtain various changes, modifications and equivalent arrangements included within the principle and spirit of the disclosure. The scope of the disclosure is defined by appended claims and the like.

The invention claimed is:

1. A speaker applicable to be fixed on an arched surface, comprising a sound making member and a fixing frame connected with the sound making member, wherein the sound making member comprises a connecting frame, a magnetic element arranged at a front portion of the connecting frame, and a damper arranged at a rear portion of the connecting frame, the fixing frame is arched-shaped and is fixedly connected with a back side of the connecting frame, and the fixing frame is arranged with a plurality of mounting holes, through which a fastening component can pass.

2. The speaker applicable to be fixed on the arched surface according to claim 1, wherein the fixing frame is cylindrically shaped.

3. The speaker applicable to be fixed on the arched surface according to claim 2, wherein an arched surface of the fixing frame forms an inner arc facing forward.

4. The speaker applicable to be fixed on the arched surface according to claim 3, wherein the mounting holes includes middle holes provided on the fixing frame, formed in a middle position, and are arranged in a longitudinal direction of the fixing frame, and includes side mounting holes symmetrically provided on a left portion and a right portion of the fixing frame.

5. The speaker applicable to be fixed on the arched surface according to claim 4, wherein the fastening component is an expansion bolt.

6. The speaker applicable to be fixed on the arched surface according to claim 1, wherein the connecting frame has a stepped cylindrical structure with a diameter increasing from front to back, the connecting frame comprises a magnet step portion and a springing step portion, the magnetic element is mounted inside the magnet step portion which is provided on a front end and has a relatively small diameter, and the damper is arranged on an inner side of the springing step portion which is provided on a rear end and has a relatively big diameter.

7. The speaker applicable to be fixed on the arched surface according to claim 6, wherein the springing step portion includes a plurality of steps which have diameters increasing from front to back, each step is provided with a plurality of through holes, respectively, and the damper is circumferentially fixedly arranged on an inner side of the through holes.

8. The speaker applicable to be fixed on the arched surface according to claim 7, wherein the through holes of different steps are evenly distributed and are staggered.

9. The speaker applicable to be fixed on the arched surface according to claim 8, wherein the connecting frame and the fixing frame have one-piece structure.

10. The speaker applicable to be fixed on the arched surface according to claim 9, wherein the connecting frame and the fixing frame are one-piece injection molded.

11. The speaker applicable to be fixed on the arched surface according to claim 2, wherein the connecting frame has a stepped cylindrical structure with a diameter increasing from front to back, the connecting frame comprises a magnet step portion and a springing step portion, the magnetic element is mounted inside the magnet step portion which is provided on a front end and has a relatively small diameter, and the damper is arranged on an inner side of the springing step portion which is provided on a rear end and has a relatively big diameter.

12. The speaker applicable to be fixed on the arched surface according to claim 3, wherein the connecting frame has a stepped cylindrical structure with a diameter increasing from front to back, the connecting frame comprises a magnet step portion and a springing step portion, the magnetic element is mounted inside the magnet step portion which is provided on a front end and has a relatively small diameter, and the damper is arranged on an inner side of the springing step portion which is provided on a rear end and has a relatively big diameter.

13. The speaker applicable to be fixed on the arched surface according to claim 4, wherein the connecting frame has a stepped cylindrical structure with a diameter increasing from front to back, the connecting frame comprises a magnet step portion and a springing step portion, the magnetic element is mounted inside the magnet step portion which is provided on a front end and has a relatively small diameter, and the damper is arranged on an inner side of the springing step portion which is provided on a rear end and has a relatively big diameter.

14. The speaker applicable to be fixed on the arched surface according to claim 5, wherein the connecting frame has a stepped cylindrical structure with a diameter increasing from front to back, the connecting frame comprises a magnet step portion and a springing step portion, the magnetic element is mounted inside the magnet step portion which is provided on a front end and has a relatively small diameter, and the damper is arranged on an inner side of the springing step portion which is provided on a rear end and has a relatively big diameter.

* * * * *